(12) United States Patent
Johnson

(10) Patent No.: US 6,308,616 B1
(45) Date of Patent: Oct. 30, 2001

(54) BARBECUE GRILL ASSEMBLY HAVING A WORK SURFACE WITH SLIDE MECHANISM

(75) Inventor: Mark Johnson, Wilmette, IL (US)

(73) Assignee: Weber-Stephen Products Co., Palatine, IL (US)

(*) Notice: Subject to any disclaimer, the term of this patent is extended or adjusted under 35 U.S.C. 154(b) by 0 days.

(21) Appl. No.: 09/637,306

(22) Filed: Aug. 11, 2000

(51) Int. Cl.$^7$ .............................. A23L 1/00; A47J 37/00; A47J 37/04; F24C 3/00; F24C 3/04

(52) U.S. Cl. .................... 99/339; 99/340; 99/446; 99/450; 99/482; 126/41 R; 126/25 R

(58) Field of Search .................... 99/337, 338, 339, 99/340, 341, 385, 400, 401, 419–421 V, 444–450, 481, 482; 126/41 R, 25 R, 9 R, 318, 334, 9 B, 276, 39 R, 39 E, 39 N, 39 G; 219/385, 400

(56) References Cited

U.S. PATENT DOCUMENTS

| | | |
|---|---|---|
| D. 293,067 | 12/1987 | Stephen et al. . |
| D. 316,355 | 4/1991 | Stephen et al. . |
| D. 327,390 | 6/1992 | Schlosser et al. . |
| D. 380,933 | 7/1997 | Schlosser et al. . |
| D. 395,378 | 6/1998 | Schlosser et al. . |
| D. 404,963 | 2/1999 | Schlosser et al. . |
| 1,964,805 | 7/1934 | Barnes . |
| 2,207,307 | 7/1940 | Teller et al. . |
| 2,349,307 | 5/1944 | Reeves . |
| 2,780,474 | 2/1957 | Farah et al. . |
| 2,817,331 | 12/1957 | Kaplan et al. . |
| 2,888,544 | 5/1959 | Kesling . |
| 2,903,549 | 9/1959 | Joseph . |
| 2,907,316 | 10/1959 | Windust . |
| 2,946,275 | 7/1960 | Compton . |
| 3,081,692 | 3/1963 | Sorensen . |
| 3,559,564 | * 2/1971 | Turner et al. ........................ 99/339 |
| 3,709,142 | * 1/1973 | Peterson ............................ 99/470 X |
| 3,713,846 | * 1/1973 | Turner et al. ...................... 99/340 X |
| 3,802,413 | 4/1974 | Pepin . |
| 4,677,964 | 7/1987 | Lohmeyer et al. . |
| 4,696,282 | 9/1987 | Incitti . |
| 4,869,228 | * 9/1989 | Sorensen ............................ 126/25 R |
| 4,886,045 | * 12/1989 | Ducate, Jr. et al. ............... 126/41 R |
| 5,027,788 | 7/1991 | Schlosser et al. . |
| 5,065,734 | * 11/1991 | Elliott ................................ 126/25 R |
| 5,070,776 | * 12/1991 | Schlosser et al. ..................... 99/450 |
| 5,076,252 | 12/1991 | Schlosser et al. . |
| 5,090,398 | 2/1992 | Raymer et al. . |
| 5,104,080 | 4/1992 | Berger . |
| 5,203,317 | 4/1993 | James . |
| 5,341,793 | 8/1994 | Brown . |

(List continued on next page.)

OTHER PUBLICATIONS

Brochure entitled "Weber Gas Barbecues," 400 Summit Series Gas Barbecue, Weber-Stephen Products Co., Aug. 1996.

Brochure entitled "Platinum Series II", Platinum Series II 3400, Weber-Stephen Products Co., Mar. 1997.

Primary Examiner—Timothy F. Simone

(57) ABSTRACT

The present invention is a barbecue grill assembly having a frame with a work surface secured by a sliding mechanism, such as a sliding track assembly. The present invention alternatively provides a work surface being a slidable burner cover assembly for an auxiliary burner of a barbecue gas grill. The assembly includes a burner cover having a body portion disposed over the auxiliary burner in a closed position and a slide mechanism attached to the grill and the cover to allow the cover to be slidably moved from the closed position to a second position wherein the auxiliary burner is exposed from underneath the body portion of the burner cover. The slide mechanism also provides extended cantilever support for the work surface in the second position.

20 Claims, 4 Drawing Sheets

U.S. PATENT DOCUMENTS

| | | | |
|---|---|---|---|
| 5,483,947 | * | 1/1996 | Giebel et al. ........................ 126/25 R |
| 5,575,198 | * | 11/1996 | Lowery ............................... 99/339 X |
| 5,632,265 | | 5/1997 | Koziol . |
| 5,741,536 | * | 4/1998 | Mauer et al. ..................... 426/281 X |
| 5,765,469 | | 6/1998 | Schlosser et al. . |
| 5,767,487 | * | 6/1998 | Tippmann ........................... 99/340 X |
| 5,768,983 | * | 2/1971 | Treiber ................................ 99/482 X |
| 5,873,355 | | 2/1999 | Schlosser et al. . |
| 5,934,183 | | 8/1999 | Schlosser et al. . |
| 5,934,184 | | 8/1999 | Schlosser et al. . |
| 5,941,229 | | 8/1999 | Schlosser et al. . |

\* cited by examiner

BARBECUE GRILL ASSEMBLY HAVING A WORK SURFACE WITH SLIDE MECHANISM

TECHNICAL FIELD

The present invention relates generally to outdoor cooking devices, such as a barbecue grill, and more particularly to a barbecue gas grill having one or more work surfaces, at least one of the work surface providing a cover for a side cooking burner.

BACKGROUND OF THE INVENTION

Barbecue grills, and in particular gas grills, have become increasingly popular in recent years. Conventionally, gas grills consist of a cart or frame that supports a firebox. The gas grills include a burner assembly adjacent to a lower portion of the firebox and a cooking grid supported along the upper edge ofthe firebox. The firebox usually includes a hinged cover to create a cooking chamber. Typically, lava rock is disposed between the cooking grid and the burner assembly. The lava rock, acting as a form of a conductive member, absorbs the heat from the burning gas and provides a generally uniform heat producing means for the food being cooked. Alternatively, the firebox may contain a metal barrier, such as sear bars positioned between the cooking grid and the gas burners, such as those disclosed in U.S. Pat. No. 4,677,964.

Other gas grill features that have become popular are side burners and work surfaces. A side burner is an auxiliary cooking surface located outside the cooking chamber. These side burners are usually disposed next to the cooking chamber on the grill frame, such as that which is disclosed in U.S. Pat. Nos. 4,677,964 and 4,777,927, both assigned to the Assignee of the present invention. The side burner is often desirable because it allows certain food items to be cooked separately from and simultaneously with the food items being cooked within the cooking chamber. To protect the burner from environmental conditions and for safety reasons, the side burner is usually provided with a burner cover.

One or more work surfaces are also desirable and convenient because they provide a surface upon which food and food preparation items, such as spices, sauces, utensils, plates, etc., can be placed while the food is being prepared. These work surfaces are also usually disposed immediately adjacent to the cooking chamber on the grill frame. A work surface may also be provided extended outward from the front of the barbecue grill cart, such as is disclosed in U.S. Pat. No. 5,070,776 and co-pending application Ser. No. 09/374,821, filed on Aug. 13, 1999, pending both assigned to the Assignee of the present invention, Weber-Stephen Products Company.

Due to size limitations of a gas grill and space constraints on the grill frame, it is often difficult to accommodate more than one of these features within the grill, particularly when these features are desired in the same grill and are disposed immediately adjacent to the cooking chamber.

Therefore, it is an object of the present invention to provide a work surface having a slide track mechanism that allows the work surface to be moved to a use position. It is further an object of the invention to provide a side burner cover that is slidable to expose the burner and also serve as a work surface for food preparation.

SUMMARY OF THE INVENTION

The present invention is a barbecue grill assembly having a frame with a work surface secured by a sliding mechanism, such as a sliding track assembly. The present invention alternatively provides a work surface being a slidable burner cover assembly for an auxiliary burner of a barbecue gas grill. The assembly includes a burner cover having a body portion disposed over the auxiliary burner in a closed position and a slide mechanism attached to the grill and the cover to allow the cover to be slidably moved from the closed position to a second position wherein the auxiliary burner is exposed from underneath the body portion of the burner cover. The slide mechanism also provides extended cantilever support for the work surface in the second position.

The slidable arrangement of the assembly provides a combination work surface and burner cover that minimizes space constraints with respect to the grill frame. The slidable cover also provides a work surface that can be positioned on the same side of the grill frame as the auxiliary burner without requiring a larger grill frame for support. This reduces the overall size requirements of the grill. This assembly also provides a shelf selectively placed in a use position to extend forward from the barbecue grill frame by extending the shelf outward along a sliding track assembly. Other features and advantages of the invention will be apparent from consideration of the following specification and drawings.

DETAILED DESCRIPTION OF THE PREFERRED EMBODIMENT

Figure 1:
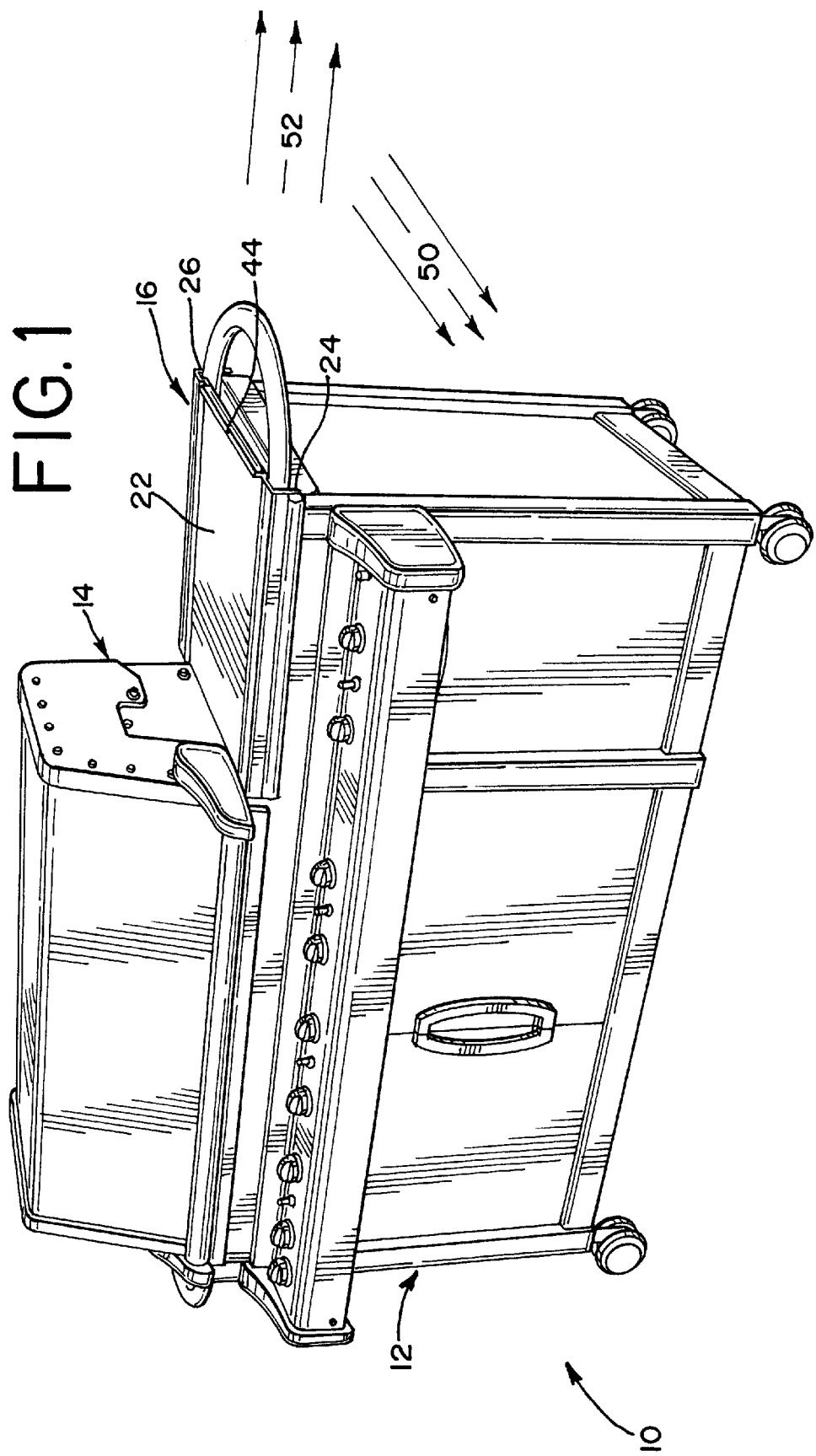
FIG. 1 is a perspective view of a gas grill incorporating an embodiment of a slidable surface assembly of the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 2:
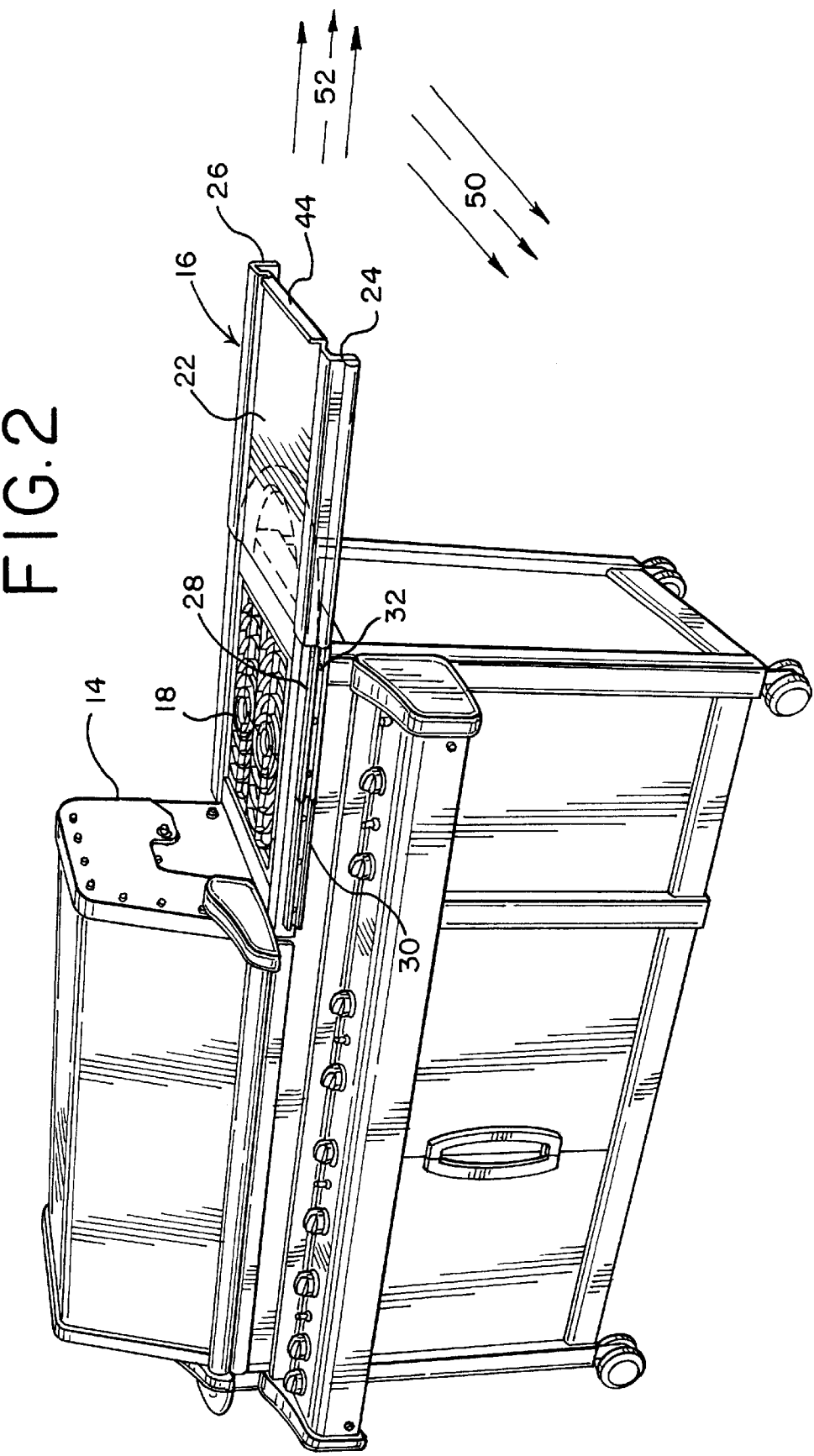
FIG. 2 is a perspective view of the gas grill of FIG. 1 showing the slidable surface in an open position.
Figure 3:
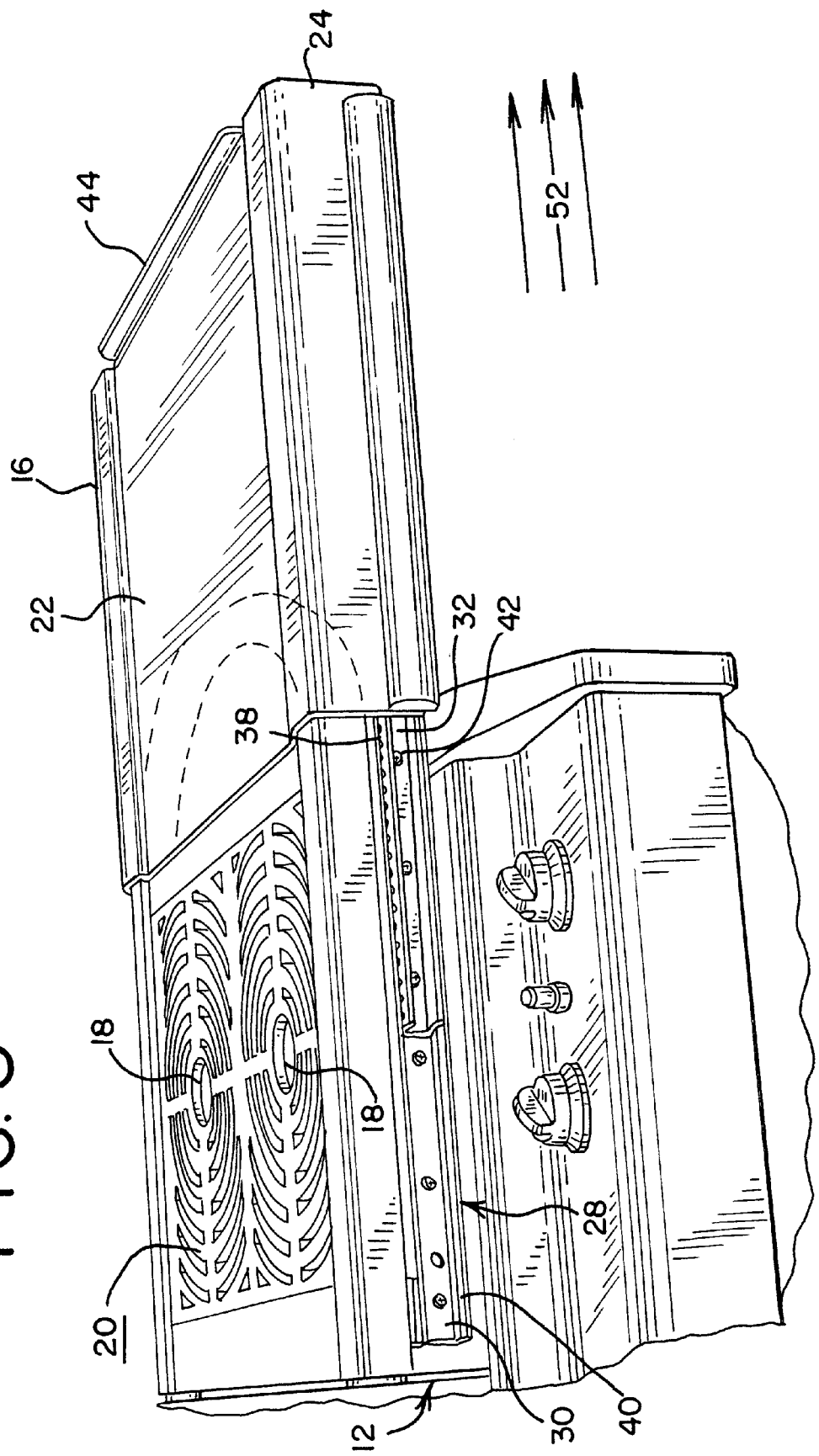
FIG. 3 is a partial perspective view of the slidable surface assembly shown in FIGS. 1 and 2.
Figure 4:
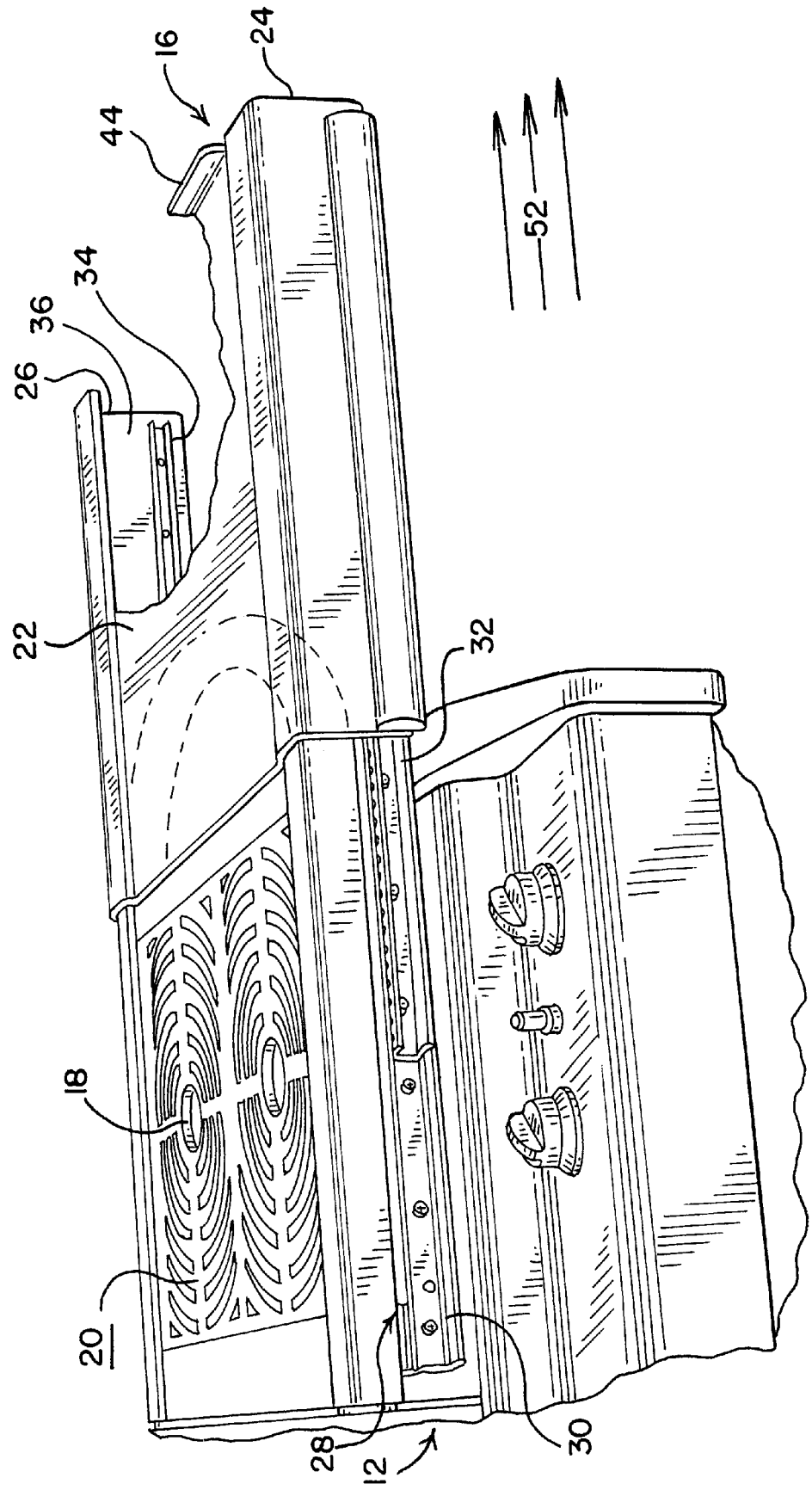
FIG. 4 is a partial perspective view of the slidable surface assembly having a portion cutaway to expose a track bearing surface and a second track segment of the assembly.

FIG. 1 shows a barbecue gas grill 10 having a frame 12 and a cooking chamber 14. The grill 10 includes a work shelf surface 16, preferably as a combination burner cover and work shelf surface, that is slidably connected to the frame 12 of the grill 10 and covers an auxiliary burner 18 disposed adjacent to the cooking chamber 14, as shown in FIG. 2. FIG. 2 shows the surface/cover 16 in an open position. The surface/cover 16 is shown in a closed position in FIG. 1. The auxiliary burner 18 includes a generally flat cooking grate surface 20 disposed over a burner unit (not shown), as best shown in FIG. 3. The auxiliary burner 18 may include more than one burner unit.

Referring to FIGS. 2 and 3, the surface/cover 16 preferably comprises a generally flat body portion 22 and two depending side flanges 24 and 26 that are transverse to the body portion 22. The surface/cover 16 is slidably mounted to the frame 12 via a sliding mechanism in the form of at least one slide track assembly 28. Preferably, the assembly provides two generally opposed and parallel slide track assemblies 28. For simplicity, only one of the two slide track assemblies 28 is shown in the drawings, but both are substantially identical. Each of the slide track assemblies includes a first track segment 30, an intermediate track segment 32, and a second track segment 34. The first track segment 30 is connected to the frame 12 of the grill 10, while the second track segment 34 is connected to a slide-engaging surface 36 of one of the flanges 24 and 26. In the preferred embodiment, the slide engaging surface 36 is located on the inner surface of the depending flanges 24, 26. Alternatively, the surface may be on an outer edge of the cover/shelf 16. The intermediate track segment 32 slidably engages both the first track segment 30 and the second track segment 34 to allow the body portion 16 to be extended laterally with respect to the auxiliary burner 18. Each of the track portions 30, 32 and 34 linearly slide with respect to each other to provide a telescoping action to the slide track assemblies 28.

In a preferred embodiment, the slide track assemblies 28 are similar to drawer-track slides having a plurality of ball bearings 38 disposed between a track bearing surface 40 of the first track segment 30 and a track bearing surface 42 of the intermediate track segment 32. Alternatively, ball bearings can also be placed between bearing surfaces of the intermediate track segment 32 and the cover second track segment 34. The ball bearings 38 provide a low-resistance sliding mechanism and also provide load bearing surfaces between the track bearing surfaces 40 and 42 when a load is placed upon the surface/cover 16. This enables the sliding mechanism to function even when a load is placed upon the surface/cover 16 when it is in an open, or extended position, as shown in FIGS. 2 and 3. The slide-track assemblies 28 provide support to the body 16 to resist a moment created by a load upon the surface/cover 16 so that it can be used as a work surface while maintaining function of the slide mechanism.

The surface/cover 16 includes a handle portion 44 adapted to provide an area a person can grasp at the handle portion 44 to slide the surface/cover 16. The surface/cover 16 is preferably made of steel and the handle portion 44 is preferably integrally formed with the surface/cover 16 utilizing metal forming techniques well known in the art of metal fabrication and forming.

It is contemplated that the surface/cover 16 and associated slide mechanism can also be disposed on the frame 12 of the grill 10 to allow the surface/cover 16 to slide and extend from the frame 12 in a front-to-back motion as well as a side-to-side, in lateral motion. In this embodiment, the surface/cover 16 extends as a work surface in a forward direction 50, rather than the lateral side direction 52 as disclosed above, and shown in FIG. 2. Therefore, this embodiment provides a front work shelf 16 extended to a position adjacent the user of the grill assembly. This embodiment of a forward direction 50 work shelf 16 provides a surface supported by extended cantilever brace, without the use of other braces or brackets secured between the work shelf 16 and the frame 12.

In the preferred embodiment, the surface/cover 16 and cooperating sliding mechanism provides a convenient combination burner cover and work surface. This combination allows both a work surface and an auxiliary burner to be positioned on the same side of the grill frame without requiring a longer grill frame for support. This combination eliminates the need to position a separate work surface on the other side of the cooking chamber, opposite the auxiliary burner. Alternatively, this combination also allows the grill to accommodate two work surfaces, one on each side of the cooking chamber, without significantly increasing the size of the grill and without extended frame to support the sliding body 16.

In another embodiment, a locking mechanism (not shown) may be provided to selectively lock the surface/cover 16 in either the first position or the extended second position. The means for locking the surface/cover 16 in a position may include, in combination or alone, a mechanical locking pin or stop activated between the frame 12 and the surface/cover 16, or between the segments 30, 32, 34 of the slide track assemblies 28. Alternative means may also include a detent and projection (not shown) within the segments 30, 32, 34 of the sliding track assemblies 28, similar to common drawer tracking mechanisms. Incorporating such mechanisms into an extendable sliding work surface on a barbecue grill assembly provides a unique variation from common drawer tracking, however, in that the present invention provides an exposed work surface 16 selectively positioned to alternative lateral positions.

While the specific embodiments have been illustrated and described, numerous modifications come to mind without significantly departing from the spirit of the invention, and the scope of protection is only limited by the scope of the accompanying claims.

What is claimed is:

1. A barbecue grill assembly having a frame and a cooking chamber, comprising;
   a shelf body being secured to the frame by a sliding track assembly, wherein said shelf is adapted to be selectively positioned along a horizontal plane relative the frame to move the shelf body between a first position to a second position, said sliding track assembly having at least one track member, each said track member having at least a first track segment and a second track segment, said first track segment being secured to the frame and said second track segment being secured to the shelf body, the first and second track segments being dimensioned to cooperatively slide relative to each other to an extended length of the track member for said shelf body being moved laterally into said second position.

2. The assembly according to claim 1, wherein;
   said shelf body in said second position being at least partially extended outward and forward of said frame.

3. The assembly according to claim 1, wherein;
   said sliding track assembly has a combination of at least three mating linear track segments, each segment slidably cooperating to provide an extended length of said sliding track assembly.

4. The assembly according to claim 1, wherein;
   said shelf body has a mounting surface for securing said second track segment, said mounting surface being an outer edge surface of the shelf.

5. The assembly according to claim 1, wherein;
   said shelf body has amounting surface for securing said second track segment, said mounting surface being an inner surface of at least one depending flange of said shelf, and said second track segment being slidably engaged with a first track segment mounted to an outer lineral surface of said frame.

6. The assembly of claim 1, wherein;
   said shelf body in said first position substantially covers an upper surface of a slide burner of the grill assembly, and said shelf body in the second position being disposed generally adjacent to said side burner to expose the side burner upper surface, and said shelf body extending outward of the frame and being supported by said sliding track assembly.

7. The assembly of claim 1, wherein;
said shelf body being selectively secured in at least one of either first or second positions by a means for locking the shelf body.

8. A barbecue grill assembly with a burner cover assembly for an auxiliary burner of a gas grill, the grill including a frame, the assembly comprising:
a cover having a generally flat surface portion and two flanges disposed transverse to the flat surface portion, each of the flanges having a slide engaging surface; and
two slide track assemblies each attached to the frame of the grill and to the slide-engaging surface of one of the flanges, the slide track assemblies allowing the cover to be slidably moved with respect to the auxiliary burner of the gas grill.

9. The burner cover assembly of claim 8, wherein the slide track assemblies provide linear movement to the cover with respect to the auxiliary burner so that the cover can be moved laterally from the auxiliary burner to expose the auxiliary burner in an open position.

10. The burner cover assembly of claim 8, wherein the cover is supported by the track assemblies in the open position to allow the flat surface portion of the cover to be utilized as a work surface.

11. The burner cover assembly of claim 8, wherein the auxiliary burner has a generally flat cooking grate disposed thereover.

12. The burner cover assembly of claim 8, wherein the flat surface portion is generally parallel to the flat cooking grate.

13. A barbeque gas grill comprising:
a grill frame;
a cooking chamber attached to the frame;
a side burner disposed adjacent to the cooking chamber and attached to the frame; and
a cover slidably connected to the frame by sliding linear tracking mechanism and adapted to cover the side burner in a first position and extend to a second position away from said burner and being exposed as a work surface adjacent the burner.

14. The barbeque grill of claim 13, wherein the cover is slidably connected to the frame with linear slide tracks that allow linear movement of the cover with respect to the side burner.

15. The barbeque grill of claim 13, wherein the cover has a substantially flat portion that can be utilized as a working surface in the first and second positions with respect to the side burner.

16. The barbeque grill of claim 13, wherein the cover includes a handle portion that can be grasped to slide the cover.

17. A barbecue grill assembly having a frame and a side burner cover assembly, the assembly comprising:
a cover having a generally flat surface portion and two depending flanges disposed transverse to the body surface portion, the body surface portion disposed over the auxiliary burner when the cover is in a closed position, each of the flanges having an inner surface with a first track segment, and;
a plurality of mating linear slide track segments, each said mating segment secured to the frame and adapted to slidably engage with a first track segment to allow the cover to be extended laterally with respect to the auxiliary burner away from the closed position.

18. The burner cover assembly of claim 17, wherein the slide track assemblies are substantially concealed by the flanges of the cover when the cover is in the closed position.

19. The burner cover assembly of claim 17, wherein the slide track assemblies include ball bearings disposed between a surface of mating track segments.

20. The burner cover assembly of claim 17, wherein the cover is supported by the track assemblies when laterally extended with respect to the auxiliary burner to allow the flat surface portion of the cover to be utilized as a work surface.

* * * * *